United States Patent
Kharina et al.

(10) Patent No.: US 7,229,033 B2
(45) Date of Patent: *Jun. 12, 2007

(54) METHOD FOR WORKING AND PROCESSING MATERIALS

(75) Inventors: Rita Adamovna Kharina, St. Petersburg (RU); Papken Arutunovich Meltonian, St. Petersburg (RU); Alexandras Mikhailovich Chepulis, Kaunas (LT)

(73) Assignee: Microscrap, Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/048,576

(22) PCT Filed: Jul. 13, 2001

(86) PCT No.: PCT/IB01/01872

§ 371 (c)(1),
(2), (4) Date: Mar. 28, 2005

(87) PCT Pub. No.: WO02/05964

PCT Pub. Date: Jan. 24, 2002

(65) Prior Publication Data

US 2005/0242216 A1    Nov. 3, 2005

(51) Int. Cl.
   *B02C 19/00*    (2006.01)
   *B02C 5/02*     (2006.01)
(52) U.S. Cl. .......................................... 241/1
(58) Field of Classification Search ................. 241/18, 241/57, 1, 47
   See application file for complete search history.

(56) References Cited

U.S. PATENT DOCUMENTS

| 4,422,581 A | 12/1983 | Chryst |
| 5,269,471 A | 12/1993 | Yamagishi |
| 5,375,775 A | 12/1994 | Keller et al. |
| 5,637,434 A | 6/1997 | Ikushima et al. |
| 7,011,259 B2 * | 3/2006 | Kharina et al. .......... 241/46.01 |

FOREIGN PATENT DOCUMENTS

| CH | 894627 | 4/1958 |
| DE | 1392872 | 5/1975 |
| DE | 42 00 827 A1 | 7/1993 |

* cited by examiner

*Primary Examiner*—Faye Francis
(74) *Attorney, Agent, or Firm*—Buchanan Ingersoll & Rooney PC

(57) ABSTRACT

This is a method for working and processing different materials, mainly elastomers, in different manufacturing processes. Moving cutting tools act upon the material to create ultrasonic-frequency oscillations of the material in a working zone. The power of the drive units is set at no less than 100–300 kW. The revolution speed of the tool is set in the range of 3,000–12,000 rev/min. The quantity of cutting edges for the tool is selected according to the relation ω×n is less than 800, where ω is equal to the angular velocity of the tool and n is equal to the number of cutting edges of tool. The attach angles of the tool are set in the range of 85–95 degrees. Separate particles of material embedded to the cutting portion of the tool are removed using a fluid flow containing gas and/or liquid. The effect is an enhanced efficiency of method, increased disposition degree and uniformity of ready product structures.

5 Claims, 3 Drawing Sheets

METHOD FOR WORKING AND PROCESSING MATERIALS

BACKGROUND OF THE INVENTION

1. Field of the Invention

The invention at hand falls into the category of techniques for the working of different types of materials, primarily elastomers, and can be employed in various technological processes.

2. Description of the Prior Art

This method can be used to process worn automobile and aircraft tires following their disposal.

A method already exists for the working of materials that contain magnetostrictive components in metallic-phase and nonmetallic-phase aggregates, which includes their exposure to a variable magnetic field and to a mechanical load, during which exposure to the magnetic field is accomplished over a range of audio frequencies, with intensity in the region where the magnetostrictive effect appears, and immediately after which the materials are exposed to a mechanical load (Inventor's Certificate 1811421, B 02 C 18/18).

The shortcomings of this method consist of a low level of efficiency during the working of plastic materials and the impossibility of its use during the processing of worn tires.

A method also already exists for the working and processing of materials during which the material being worked is exposed to a moving cutting tool and ultrasound-frequency oscillations are created in the material working area (see English Patent 2004200, Mar. 28, 1979).

Because it has the greatest number of similar features and the most similar result is achieved during its use, this latter preexisting engineering solution was selected as the closest analog of the invention at hand.

The shortcomings of this analog consist of a low level of efficiency during the working of elastomers due to their high plasticity and high friction coefficient. The disintegration of elastomers is a complex technical task that requires a high frequency and a high working speed, which ensures the observance of the condition wherein the relaxation rate of the elastomer being worked, is less than its disintegration rate.

SUMMARY OF THE INVENTION

The invention at hand is based on the resolution of the problem of creating an efficient technology for the working, primarily the disintegration, of different materials, especially elastomers, by means of moving the oscillations that inevitably occur in a "tool-material" system to higher resonance frequencies, which ensures the existence of cumulative jets in the area where the cutting edges exert an influence on the material being worked, as well as a cumulative jet energy density that is high enough to facilitate the formation of running cracks in the body of the material being worked. In this instance, conditions are created that ensure the disintegration of elastomers during their exposure to the cutting tool and the enhancement of surface smoothness during the working of metals.

This stated objective is achieved by virtue of the fact that in the subject method for the working and processing of materials, which consists of exposing the material being worked to a moving cutting tool and creating ultrasound-frequency oscillations in the material working area, the output of the drive mechanism is fixed at 100 to 300 kilowatts (kW) during the working and processing of materials, the rotational speed of the tool is set at 3,000–12,000 revolutions per minute (rpm), and the number of tool cutting edges is set based on the correlation $\omega \times n > 8,000$, where $\omega$ is the angular rotational speed of the tool, n is the number of tool cutting edges, and the angle of incidence of the tool is set at 85–95°. Here, the loosened particles of the material embedded in the cutting section of the working tool are carried away by a medium flow that consists of a gas, or a fluid, or a combination thereof. This medium flow is delivered at gauge pressure, while the material being worked is conveyed to and from the tool in the reciprocating or "start-stop" mode.

DETAILED DESCRIPTION OF THE INVENTION

The essence of the invention for which this patent is pending is expressed in the following complement of indispensable features, which is adequate for achieving the technical result described above.

Using the subject invention, the previously specified objective is achieved by virtue of the fact that the method for the working of materials, which includes the exposure of the material being worked to a moving, for example, a rotating, working tool, is characterized by the fact that the speed of movement of the working tool and its rate of advance, as well as the number of working tool cutting edges, are set based on the condition of creating ultrasound-frequency oscillations in the working area, during which the removal of the separated particles is accomplished by means of injecting the set of channels cut into the working tool's body with a medium flow that consists of at least one gas and/or at least one fluid.

This constitutes of a set of indispensable features that ensure the achievement of the desired technical result in all instances when the proposed method is used.

In addition, the solution for which this patent is pending is characterized by specific parameters for the technological mode, to wit:

the medium flow is delivered to the channels at gauge pressure;

the static pressure of the medium flow within a channel is selected with allowance for the geometric dimensions of the separated particles of the material being worked and accordingly their sail effect;

the geometry of the cutting edges, particularly the angle of incidence, is selected based on the assurance of the existence of cumulative jets in the area where the cutting edges exert an influence on the material being worked, as well as a cumulative jet energy density that is high enough to facilitate the formation of running cracks in the body of the material being worked;

the conveyance of the material being worked to and from the working tool is accomplished in the reciprocating or "start-stop" mode, and;

the gas that is a part of the pressurized medium is treated beforehand, for example, it is ionized or ozonized.

The realization of the distinctive features of the subject invention (together with the features listed in the condensed patent claims section) culminates in the achievement of important new object properties. In the proposed engineering solution, the efficiency of the working of materials, especially elastomers, is considerably enhanced, in addition to which the homogeneity of the finished product is improved by virtue of the previously described combination of working conditions, parameters, and factors.

Figure 1:
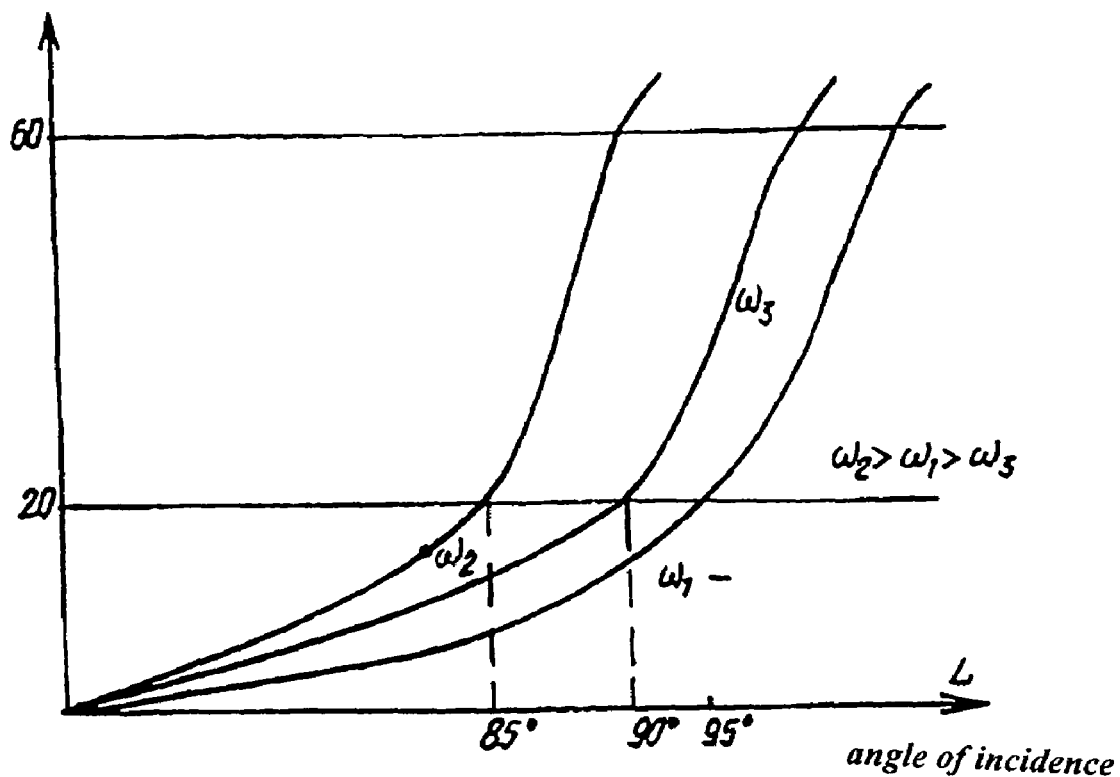
FIG. 1 is a graphical representation of the dependence of change in frequency of the tool-material system on the angle of incidence of a working tool cutting edge.
Figure 2:
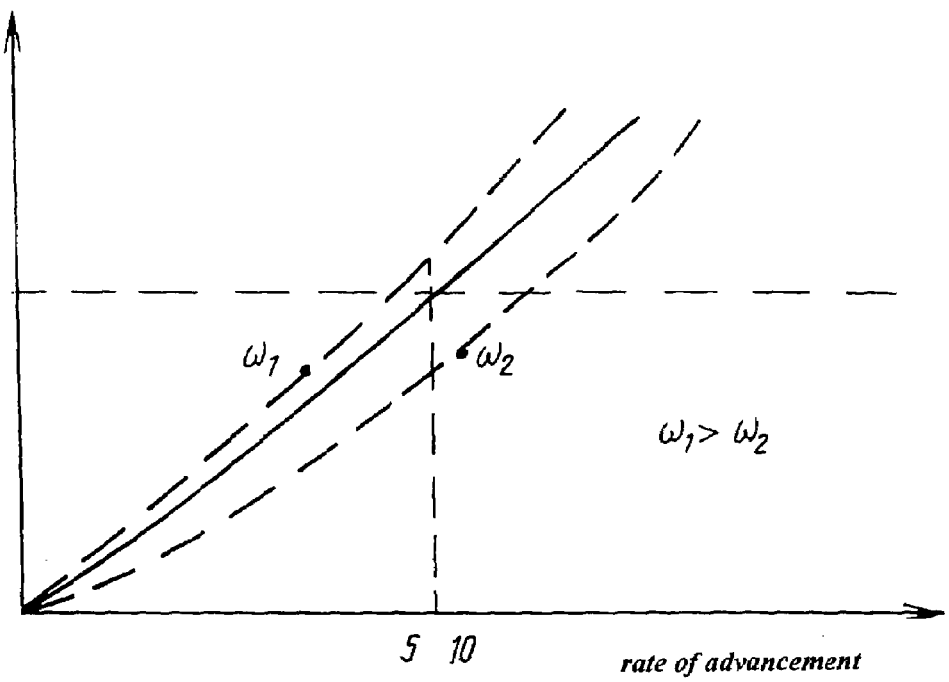
FIG. 2 is a graphical representation of the dependence upon the rate of advance of the working tool.
Figure 3:
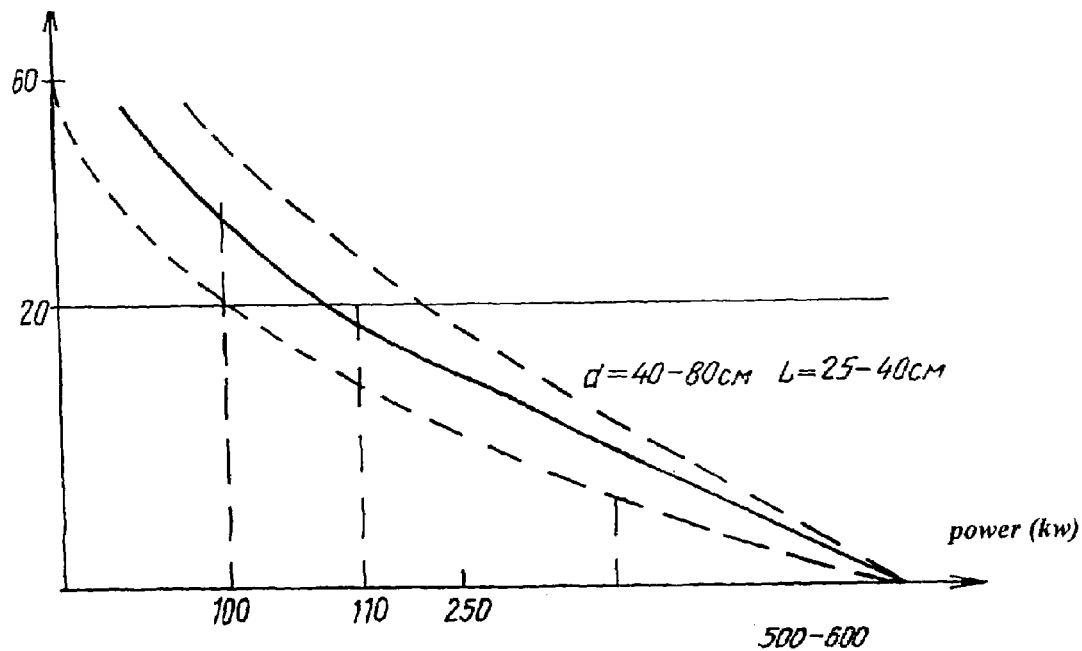
FIG. 3 is a graphical representation of the dependence on the number of cutting edges on the working tool.
Figure 4:
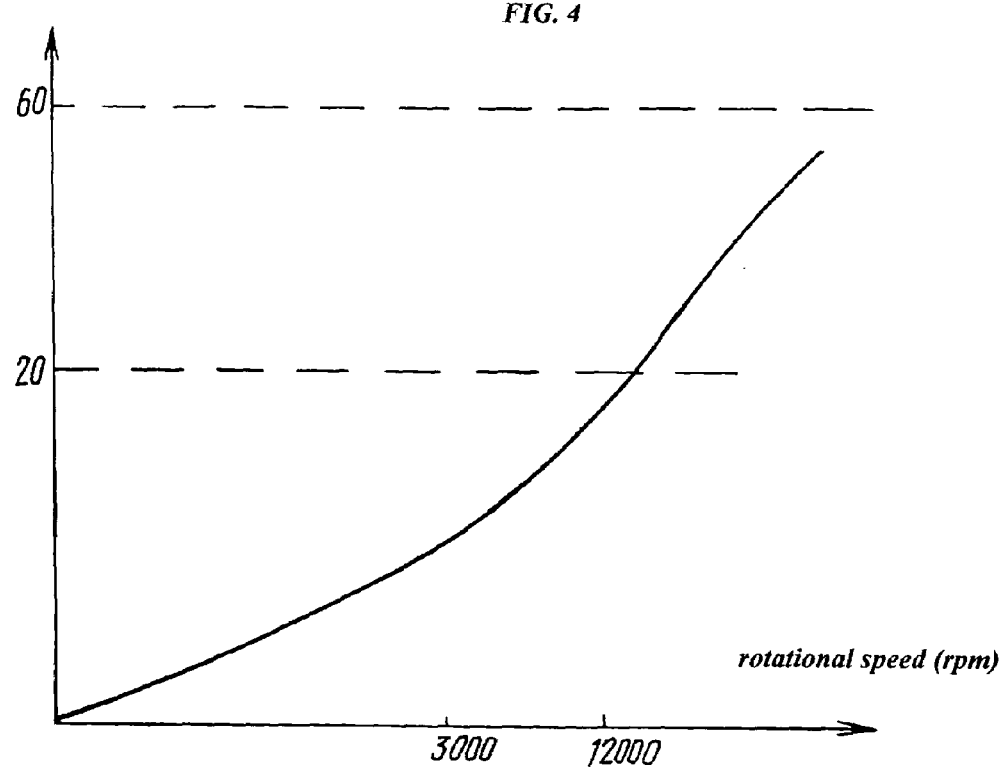
FIG. 4 is a graphical representation of the dependence on the rotational speed of the working tool.
Figure 5:
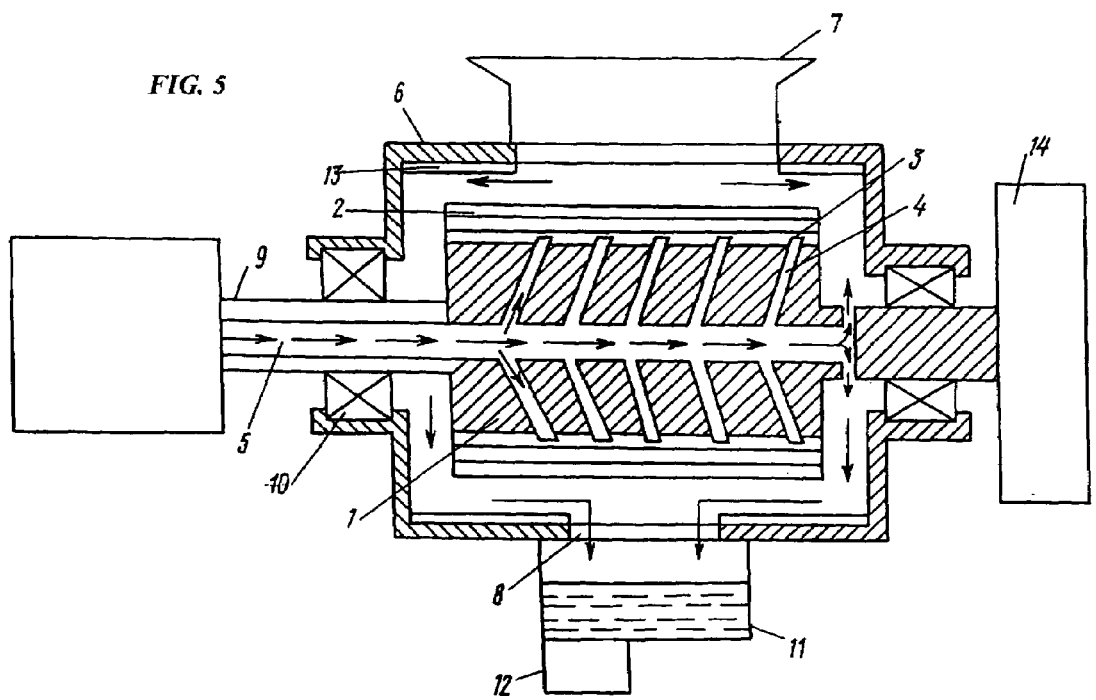
FIG. 5 is a schematic representation of an apparatus operating according to the method of the present invention.

The dependence of a change in the frequency of the "tool-material" system on the angle of incidence of a working tool cutting edge is depicted in FIG. 1, the dependence upon the rate of advance of the working tool is shown in FIG. 2, the dependence upon the number of cutting edges is reflected in FIG. 3, the dependence upon rotational speed—in FIG. 4, and the device that facilitates the use of the subject method is pictured in FIG. 5.

The proposed parameters were selected based on the condition of the development of oscillations in the "material-tool" system, the frequency of which lies in the ultrasound oscillation region and which ensure the production of disperse structures.

The method at hand is realized in the following manner (FIG. 5).

The device contains a rotating cylindrical working tool, 1. The surface of the working tool, 1, is equipped with a sufficient number of cutting edges, 2. Channels, 3, cut into the working tool's housing are fashioned between the adjacent cutting edges, 2. The cavities of these channels, 3, are connected to a pressurized medium source by means of shaped conduits, 4. This medium is delivered to the device through a central header, 5. The working tool, 1, is situated inside a housing, 6, that has pipes for introducing the source material, 7, and discharging the finished product, 8. Here, the working tool is mounted on a shaft, 9. The angle of incidence of the cutting edges is set within limits of 85–95°. The output of the drive mechanism is 100–300 kW and the rotational speed of the tool is 3,000–12,000 rpm. The shaft, 9, is mounted in the housing, 6, through the use of bearings, 10. The finished product proceeds to a receiving tank, 11. A filter, 12, is installed in order to facilitate fluid drainage. For the purpose of reducing the likelihood of working tool setting, helical guides, 13, are fashioned inside the housing, 6. A high-speed (3,000–12,000 rpm) electric motor, 14, serves to set the working tool into rotation.

The speed of movement, for example, the rotation, of the working tool and its rate of advance, as well as the number of working tool cutting edges, are selected based on the condition of the creation of ultrasound oscillations in the working zone using the correlation $\omega\,n > 8,000$, where $\omega$ is the angular rotational speed of the tool and n is the number of tool cutting edges. The large number of cutting edges on the working tool increases the number of individual impacts by the working tool on the material being worked. By acting on the material being worked in the working area, the ultrasound oscillations significantly reduce power consumption for working by means of lowering the elastomer vitrification temperature, as well as by means of energy release at the boundaries and within the structural defects of the material being worked. These oscillations also take part in superimposing an energy effect on the working area.

A set of channels cut into the working tool's body is created between the adjacent cutting edges for the purpose of removing the separated particles and diminishing the thermal load in the working areas. These channels are oriented along the surface of the working tool and are connected to the medium source by lines.

The injection of the subject channels is accomplished using a medium flow that consists of at least one gas and/or at least one fluid, which is delivered through the conduits at a gauge pressure of several atmospheres as necessary. The flow of this pressurized medium through the channels simultaneously performs a number of functions that are crucial to the enhancement of working efficiency, to wit:

it takes part in detaching particles of the material being worked by acting on the root of a chip by virtue of its sail effect;

removes the heat released during working;

it creates a pseudofluidized bed of detached particles of the material being work by removing them from the working area, thereby precluding their participation in the process of heat formation as a result of friction, and;

it alters the friction coefficient in the "cutting edge-material" system, thereby ensuring the absence of slip in the presence of high working speeds.

Gases and/or fluids in different combinations and with different parameters are selected as the pressurized medium depending upon the nature and properties of the material being worked. This medium may be comprised of compressed air, an air-water mixture, inert gases, and active gases. The prior ozonization or ionization of a gas that is a part of a pressurized medium can appreciably enhance working efficiency by means of improving the oxidative or active properties of the gas.

The geometry of the cutting edges, particularly the angle of incidence, is selected based on the assurance of the existence of cumulative jets in the area where the cutting edges exert an influence on the material being worked, as well as a cumulative jet energy density that is high enough to facilitate the formation of running cracks in the body of the material being worked, which leads to the appearance of shear planes and the efficient disintegration of the material being worked (the angle of incidence equals 85–95°).

In order to reduce the temperature load in the working area, the material being worked can be conveyed to and from the working tool in the reciprocating or "start-stop" mode, during which the supplemental cooling of the working zone occurs at those moments in time when the conveyance of the material being worked is halted.

As compared to all existing tools with similar applications, the use of the invention at hand ensures a significant increase in material working efficiency. During the working of elastomers, a high degree of finished product homogeneity and fineness is achieved. During the working of wood, a considerable increase in the speed of cutter rotation is possible without scorching the wood. Here, productive capacity is increased, the quality of the surface being worked is enhanced, and the generation of disperse particles instead of the traditional chips is ensured.

We claim:

1. A method for the working and processing of materials, during which a moving working cutting tool acts on the material being worked and ultrasound-frequency oscillations are created in the material working area, wherein the drive mechanism is set at not less than 100–300 kW, the rotational speed of the tool is set at 3,000–12,000 rpm, the number of tool cutting edges is set based on the correlation $\omega \times n > 8,000$, where $\omega$ is the angular rotational speed of the tool and n is the number of tool cutting edges, the angle of incidence of the tool is set at 85–95°, and the separated particles of the material embedded in the cutting section of the working tool are removed by a medium flow that consists of a gas, or a fluid, or a combination thereof, said medium flow being delivered at gauge pressure above atmospheric pressure and the material being worked being conveyed to and from the tool in the reciprocating or start-stop mode.

2. A method for processing materials, the method comprising the steps of:

providing a housing including an inlet for introducing source materials to be processed and an outlet for discharging finished product, the housing having a working tool having a plurality of cutting edges and a plurality of channels adjacent said plurality of cutting edges, the working tool being rotationally mounted within the housing, means for rotating the working tool and means for delivering a pressurized fluid medium to said plurality of channels; and operating the apparatus at an oscillation frequency such that $\omega \times n > 8,000$ hertz, where $\omega$ is representative of the angular rotational speed of the working tool measured in revolutions per second and n is a number representative of said plurality of cutting blades.

3. The method as recited in claim 2, wherein the working tool is rotated at an angular rotational speed of about 3,000 rpm to about 12,000 rpm.

4. The method as recited in claim 2, further comprising the steps of inputting tires into the inlet and operating the working tool such that the finished product has a crumb size of about 10–100 microns.

5. A method for grinding vehicle tires, the method comprising the steps of:

providing a housing including an inlet for introducing the vehicle tires therein and an outlet for discharging ground tire material, rotatably mounting a cylindrical working tool in the housing, the cylindrical working tool having a plurality of cutting edges each having an angle of incidence of about 85°–95° on an outer surface thereof and a plurality of channels between said cutting edges and the working tool having a header in fluid communication with each of said plurality of channels;

rotating the cylindrical working tool at an angular speed of rotation of about 3,000–12,000 rpm;

providing a pressurized fluid to the header such that pressurized fluid is introduced into said plurality of channels; and grinding the tire material to a crumb size of about 10–100 microns.

* * * * *